US010110139B1

(12) United States Patent
Hanada et al.

(10) Patent No.: US 10,110,139 B1
(45) Date of Patent: Oct. 23, 2018

(54) MATRIX CONVERTER AND METHOD FOR DETERMINING CONSTANTS OF ALTERNATING-CURRENT MOTOR

(71) Applicant: KABUSHIKI KAISHA YASKAWA DENKI, Kitakyushu-shi (JP)

(72) Inventors: Toshihiro Hanada, Fukuoka (JP); Shinichi Akimoto, Fukuoka (JP); Hiroyuki Imayoshi, Fukuoka (JP); Keisei Inoki, Fukuoka (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/787,006

(22) Filed: Oct. 18, 2017

(30) Foreign Application Priority Data

Apr. 21, 2017 (JP) ................................. 2017-084655

(51) Int. Cl.
*H02P 6/16* (2016.01)
*H02M 5/27* (2006.01)
*H02P 25/062* (2016.01)

(52) U.S. Cl.
CPC ............ *H02M 5/27* (2013.01); *H02P 25/062* (2016.02)

(58) Field of Classification Search
CPC ........... H02M 1/34; H02M 1/32; H02M 5/297
See application file for complete search history.

(56) References Cited

U.S. PATENT DOCUMENTS

2009/0284211 A1 11/2009 Gao et al.
2013/0328309 A1* 12/2013 Fujii ..................... F03D 7/0272
290/44

FOREIGN PATENT DOCUMENTS

| EP | 2 120 326 A2 | 11/2009 |
| JP | 2007-151235 | 6/2007 |
| WO | WO 2010/044455 A1 | 4/2010 |
| WO | WO 2016/157391 | 10/2016 |

OTHER PUBLICATIONS

Extended European Search Report dated Mar. 26, 2018 in European Patent Application No. 17196746.6, 8 pages.

* cited by examiner

*Primary Examiner* — Karen Masih
(74) *Attorney, Agent, or Firm* — Oblon, McClelland, Maier & Neustadt, L.L.P.

(57) ABSTRACT

A matrix converter includes a power converter circuit connectable on one side thereof with an alternating-current supply via a high-frequency filter and connectable on another side thereof with an alternating-current motor; a snubber circuit connected with a one-side line for connecting the high-frequency filter and the power converter circuit; a discharge switch discharging a charge accumulated in the snubber circuit depending on a voltage of the snubber circuit; and a control circuit configured to execute controlling the power converter circuit on the basis of a carrier frequency in test such that a test voltage is applied to the alternating-current motor, changing the carrier frequency in test on the basis of an operation state of the discharge switch, and determining constants of the alternating-current motor on the basis of a response state of the alternating-current motor at the time when the test voltage is applied.

13 Claims, 5 Drawing Sheets

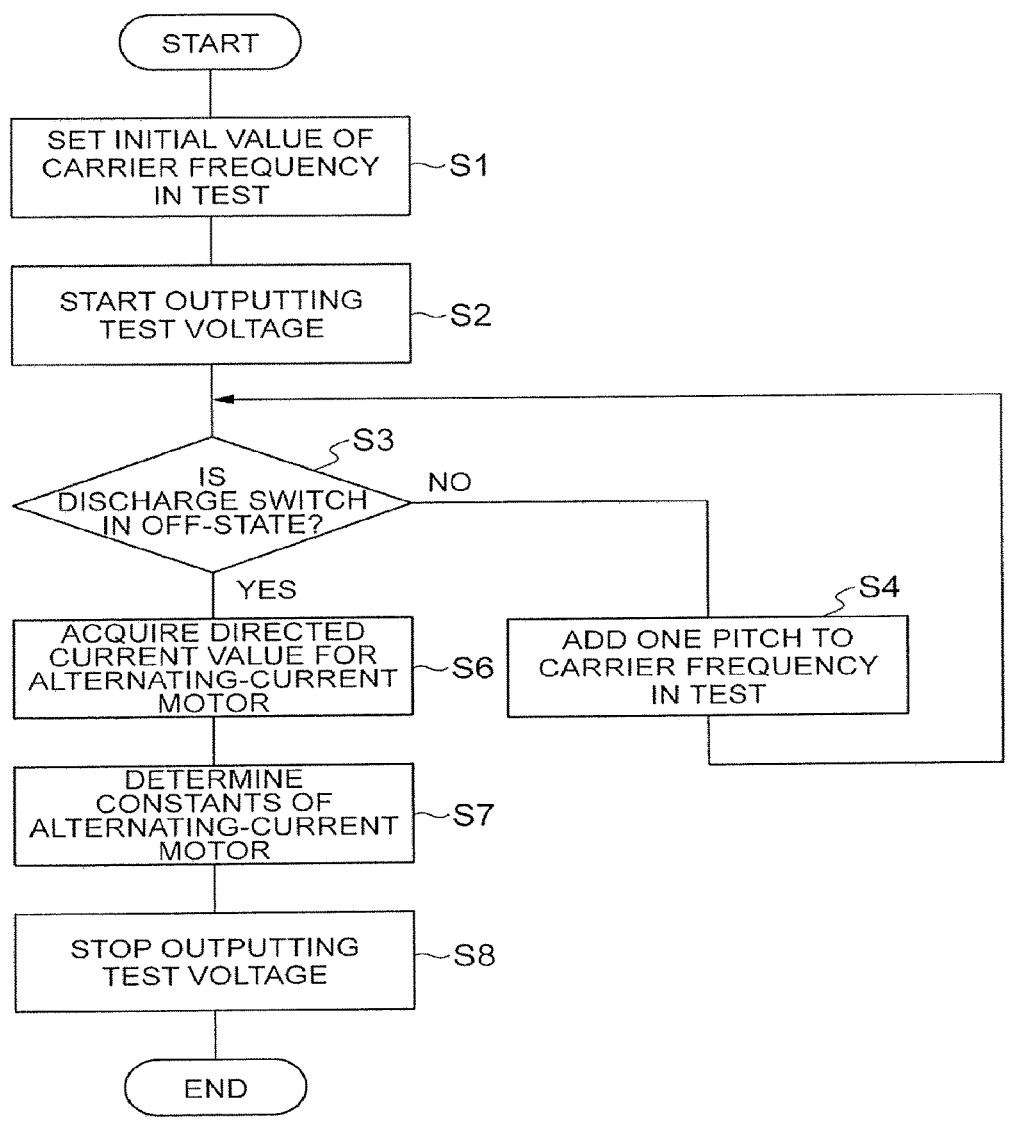

MATRIX CONVERTER AND METHOD FOR DETERMINING CONSTANTS OF ALTERNATING-CURRENT MOTOR

CROSS-REFERENCE TO RELATED APPLICATION

This application is based upon and claims the benefit of priority from Japanese Patent Application No. 2017-084655, filed on Apr. 21, 2017, the entire contents of which are incorporated herein by reference.

BACKGROUND

1. Field

The present disclosure relates to a matrix converter and a method for determining constants of an alternating-current motor.

2. Description of the Related Art

In Japanese Unexamined Patent Publication No. 2007-151235, a matrix converter is disclosed which comprises bidirectional switching elements connected in a matrix, a snubber module connected in parallel to the bidirectional switching elements and having a rectifier circuit, and a discharge circuit connected to an output stage of the snubber module and having a switching element and a resistance element connected in series with each other.

SUMMARY

A matrix converter according to an aspect of the present disclosure comprises a power converter circuit performing bidirectional power conversion between one side and another side thereof, the power converter circuit being connectable on the one side thereof with an alternating-current supply via a high-frequency filter and connectable on the other side thereof with an alternating-current motor; a snubber circuit connected with a one-side line for connecting the high-frequency filter and the power converter circuit; a discharge switch discharging a charge accumulated in the snubber circuit depending on a voltage of the snubber circuit; a test control module controlling the power converter circuit on the basis of a carrier frequency in test such that a test voltage is applied to the alternating-current motor; a carrier frequency setting module changing the carrier frequency in test on the basis of an operation state of the discharge switch; and a constant determining module determining a constant of the alternating-current motor on the basis of a response state of the alternating-current motor at a time when the test voltage is applied.

A method for determining constants of an alternating-current motor according to another aspect of the present disclosure is a method for determining constants of an alternating-current motor using a matrix converter, the matrix converter comprising a power converter circuit performing bidirectional power conversion between one side and another side thereof, the power converter circuit being connectable on the one side thereof with an alternating-current supply via a high-frequency filter and connectable on the other side thereof with an alternating-current motor; a snubber circuit connected with a one-side line for connecting the high-frequency filter and the power converter circuit; and a discharge switch discharging a charge accumulated in the snubber circuit depending on a voltage of the snubber circuit, the method comprising controlling the power converter circuit on the basis of a carrier frequency in test such that a test voltage is applied to the alternating-current motor, changing the carrier frequency in test on the basis of an operation state of the discharge switch, determining a constant of the alternating-current motor on the basis of a response state of the alternating-current motor at a time when the test voltage is applied.

BRIEF DESCRIPTION OF THE DRAWINGS

FIG. 5 is a flowchart illustrating a procedure of determining constants of an alternating-current motor.

DETAILED DESCRIPTION

Hereinafter, a description is given of an embodiment in detail with reference to the drawings. In the description, the same components or components having the same function are designated by the same reference sign, and a duplicated description is omitted.

[Matrix Converter]

Figure 1:
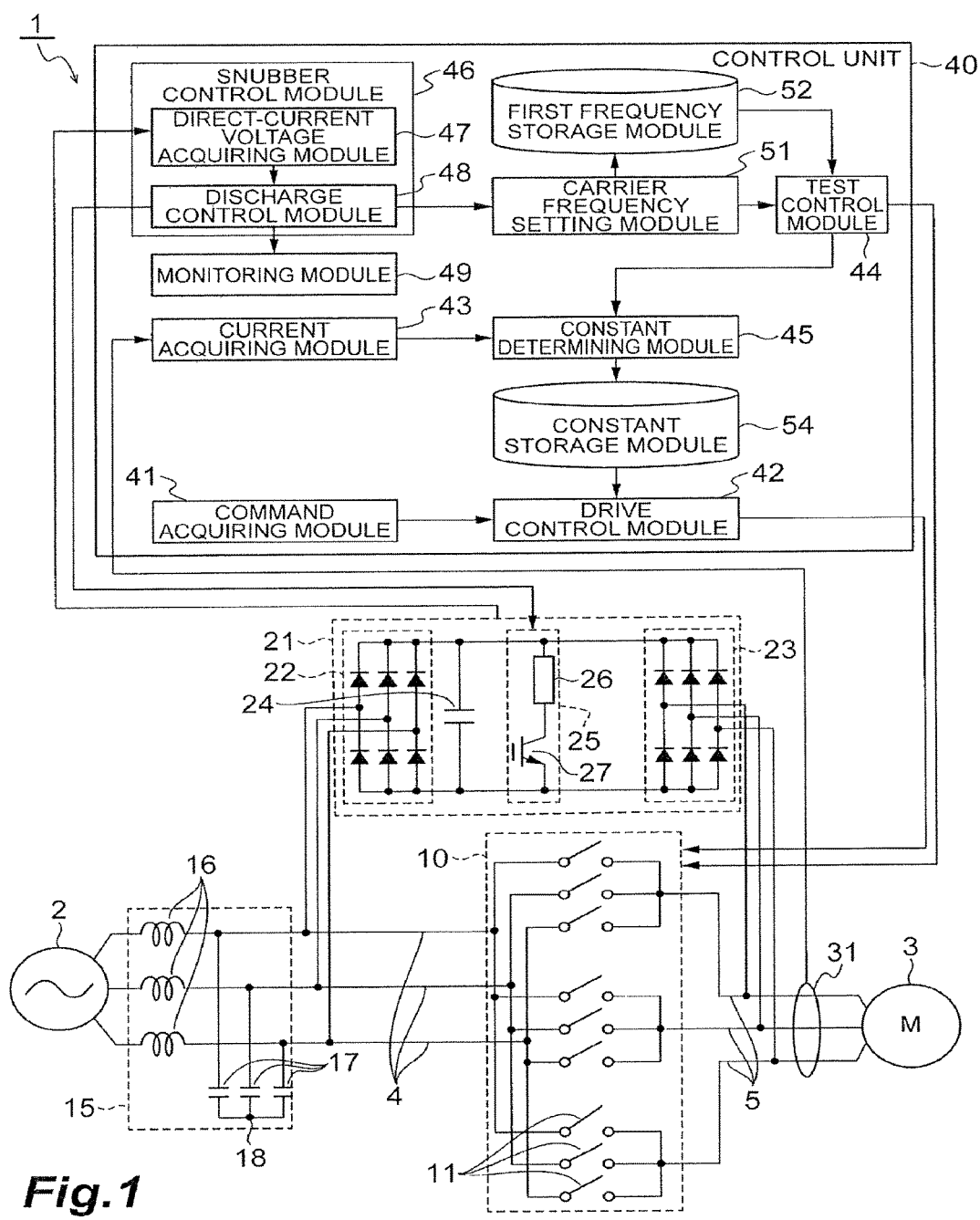
FIG. 1 is a schematic view of an electric power system including a matrix converter.

As shown in FIG. 1, a matrix converter 1 is a device performing bidirectional power conversion between an electricity system 2 including an alternating-current supply and a load such as an alternating-current motor 3, for example. The electricity system 2 is a power network for a three-phase alternating current, for example. The alternating-current motor 3 is an induction motor, for example, but may be a synchronous motor. The matrix converter 1 converts the alternating-current power input from the electricity system 2 into alternating-current power for driving the alternating-current motor 3, and converts regenerative electric power from the alternating-current motor 3 into alternating-current power for the electricity system 2.

The matrix converter 1 includes a power converter circuit 10, a high-frequency filter 15, a snubber circuit 21, a discharge circuit 25, a current sensor 31, and a control unit 40.

The power converter circuit 10 is connectable on one side thereof with the alternating-current supply via the high-frequency filter 15. The power converter circuit 10 is connectable on the other side thereof with the alternating-current motor 3. The power converter circuit 10 directly performs bidirectional power conversion (i.e., power conversion without through a process of converting into direct current) between the one side and the other side. The power converter circuit 10 includes a plurality of bidirectional switches 11. For example, the power converter circuit 10 includes nine bidirectional switches 11 connected in a matrix with three rows and three columns. As described later, the bidirectional switches 11 are controlled by the control unit 40 via a gate driver (not shown).

Figure 2:
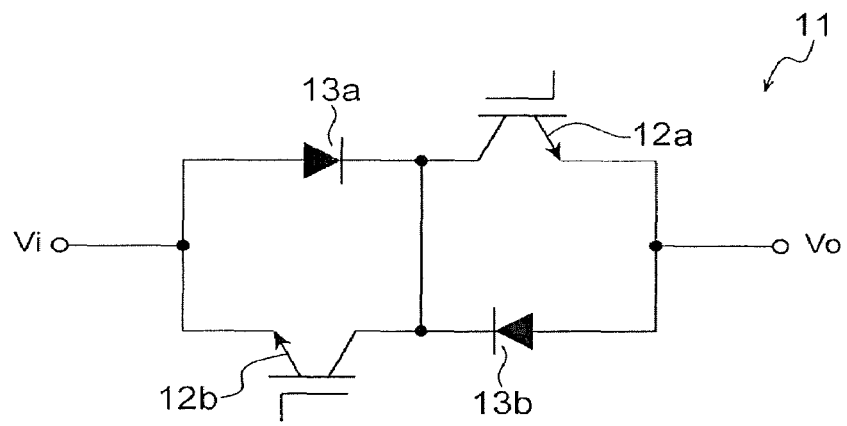
FIG. 2 is a diagram showing an example of a bidirectional switch.

A configuration of the bidirectional switch 11 is not specifically limited so long as its conducting direction is controllable. Examples of the configuration of the bidirectional switch 11 include those in which a switch element (also referred to as a switching element) 12a and a diode 13a which are connected in series with each other are connected in parallel with a switch element 12b and a diode 13b which are connected in series with each other, a direction of the switch element 12a and the diode 13a being opposite to a direction of the switch element 12b and the diode 13b, as shown in FIG. 2. In FIG. 2, a cathode of the diode 13a and a cathode of the diode 13b are connected, but the cathode of the diode 13a and the cathode of the diode 13b may not be connected. The switch elements 12a and 12b are, for example, insulated gate bipolar transistors (IGBTs).

The high-frequency filter 15 is, for example, a harmonic filter, and provided between the electricity system 2 and the power converter circuit 10. The high-frequency filter 15 suppresses high frequency switching noises output from the power converter circuit 10 side to the electricity system 2 side. For example, the high-frequency filter 15 includes an AC reactor 16 provided in each phase of alternating current between the electricity system 2 and the power converter circuit 10, and a capacitor 17 (e.g., a film capacitor) provided between each phase and a neutral point 18 between the AC reactor 16 and the power converter circuit 10. The capacitor 17 may be provided between the phases of alternating current between the AC reactor 16 and the power converter circuit 10.

The matrix converter 1 does not necessarily have the high-frequency filter 15. If the matrix converter 1 does not have the high-frequency filter 15, the high-frequency filter 15 may be externally provided between the electricity system 2 and the matrix converter 1.

The snubber circuit 21 is connected with a one-side line 4 for connecting the high-frequency filter 15 and the power converter circuit 10, and converts the power of the one-side line 4 into direct current to input to a capacitor 24. The snubber circuit 21 may be further connected with an other-side line 5 for connecting the power converter circuit 10 and the alternating-current motor 3, and may convert also the power of both the one-side line 4 and the other-side line 5 into direct current to input to the capacitor 24.

For example, the snubber circuit 21 includes a primary side diode bridge 22, a secondary side diode bridge 23, and the capacitor 24. The primary side diode bridge 22 rectifies (converts into direct current) the alternating-current power input from the electricity system 2 to output to the capacitor 24. The secondary side diode bridge 23 rectifies the alternating-current power input from the alternating-current motor 3 to output to the capacitor 24. The capacitor 24 is an electrolytic capacitor, for example.

The snubber circuit 21 serves to absorb inrush power from the electricity system 2 side and the alternating-current motor 3 side. The direct current power generated by the snubber circuit 21 is used as power for controlling the power converter circuit 10.

The discharge circuit 25 is a circuit for suppressing voltage rise of the capacitor 24. For example, the discharge circuit 25 includes a resistance 26, and a discharge switch 27 connected in series the resistance 26.

The discharge switch 27 is a switch for discharging charge accumulated in the snubber circuit 21 (i.e., charge accumulated in the capacitor 24) depending on a voltage of the snubber circuit 21 (i.e., a voltage of the capacitor 24). For example, the discharge switch 27 is controlled by the control unit 40 such that it is put into an on-state if the voltage on both ends of the capacitor 24 exceed a predetermined value, and it is put into an off-state if the voltage on both ends of the capacitor 24 is less than a predetermined value, as described later. In the on-state, the power accumulated in the capacitor 24 flows through the resistance 26 so that the capacitor 24 is discharged. In the off-state, a path of the current through the resistance 26 is blocked so that the direct current power rectified by the primary side diode bridge 22 and the secondary side diode bridge 23 is charged into the capacitor 24.

If the discharge switch 27 is put into the on-state, the resistance 26 consumes and converts into thermal energy the power accumulated in the capacitor 24.

The current sensor 31 detects the current in each phase to be output from the power converter circuit 10 to the alternating-current motor 3.

The control unit 40 is configured to execute controlling the power converter circuit 10 on the basis of a carrier frequency in test such that a test voltage is applied to the alternating-current motor 3, changing the carrier frequency in test on the basis of an operation state of the discharge switch 27, and determining constants of the alternating-current motor 3 on the basis of a response state of the alternating-current motor 3 at the time when the test voltage is applied. Here, the test includes determining (tuning) the constants of the alternating-current motor 3 connected to the matrix converter 1, for example.

For example the control unit 40 has, as a functional configuration (hereinafter, referred to as a "function module"), a command acquiring module 41, a drive control module 42, a current acquiring module 43, a test control module 44, a constant determining module 45, a snubber control module 46, a carrier frequency setting module 51, and a first frequency storage module 52.

The command acquiring module 41 acquires control target values of a speed, torque, or the like of the alternating-current motor 3 from a control device on an upper stage, for example.

The drive control module 42 controls the power converter circuit 10 via a gate driver 30 to output the power for drive to the alternating-current motor 3. For example, the drive control module 42 calculates power as the above power for drive for making the alternating-current motor 3 follow the control target value acquired by the command acquiring module 41, and controls the power converter circuit 10 such that the relevant power is output to the alternating-current motor 3.

The drive control module 42 controls the power converter circuit 10 on the basis of a carrier frequency in drive. In other words, the drive control module 42 changes over (performs switching) a conductive state of the bidirectional switch 11 depending on a pulsed wave of a carrier frequency in drive to change a width of the pulsed wave, and thereby, controls the power output to the alternating-current motor 3. For example, the drive control module 42 controls the power converter circuit by means of a space vector modulation (SVM) scheme or a pulse width modulation (PWM) scheme.

The test control module 44 controls the power converter circuit 10 such that the test voltage is applied to the alternating-current motor 3. The test voltage is a voltage for determining the constants of the alternating-current motor 3, and an amplitude and frequency of the test voltage is set to such an extent that the alternating-current motor 3 is not operated (or, that the alternating-current motor 3 is operated at a very slow speed), for example. Examples of the constants of the alternating-current motor 3 include impedances, resistances, and inductances of various windings. The test control module 44 may adequately change the test voltage depending on a course of determining the constant.

The test control module 44 controls the power converter circuit 10 on the basis of the carrier frequency in test. In other words, the test control module 44 changes over the conductive state of the bidirectional switch 11 depending on a pulsed wave of the carrier frequency in test to change a width of the pulsed wave, and thereby, controls the voltage output to the alternating-current motor 3. For example, the test control module 44 controls the power converter circuit by means of the SVM scheme or the PWM scheme. As described later, the carrier frequency in test is set by the carrier frequency setting module 51.

The current acquiring module 43 acquires a directed value by the current sensor 31 (a value of the current of each phase to be output to the alternating-current motor 3).

The constant determining module 45 tunes the constants of the alternating-current motor 3. In other words, the constant determining module 45 determines the constants of the alternating-current motor 3 on the basis of the response state of the alternating-current motor 3 at the time when the above test voltage is applied. Specific examples of the response state of the alternating-current motor 3 include a current value to be output to the alternating-current motor 3 depending on the above test voltage, a voltage value between terminals of the alternating-current motor 3, a speed of the alternating-current motor 3, and combinations of these values. Hereinafter, a description is given assuming that the response state of the alternating-current motor 3 is the current value to be output to the alternating-current motor 3. For example, the constant determining module 45 acquires the current value at the time when the above test voltage is output to the alternating-current motor 3 from the current acquiring module 43, and determines the constants of the alternating-current motor 3 on the basis of the relevant current value. For example, the constant determining module 45 finds the impedance of the alternating-current motor 3 from a ratio of the test voltage applied to the alternating-current motor 3 and the current of each phase flowing through the alternating-current motor 3 at the time when the relevant test voltage is applied. The constant determining module 45 writes the determined constants into a constant storage module 54. The constants stored in the constant storage module 54 are used to calculate the above power for drive by the drive control module 42.

The snubber control module 46 has a direct-current voltage acquiring module 47 and a discharge control module 48. The direct-current voltage acquiring module 47 acquires the voltage between both ends of the capacitor 24 to output to the discharge control module 48. For example, the direct-current voltage acquiring module 47 performs analog-digital conversion of the voltage between both ends of the capacitor 24 (or a voltage obtained by diminishing the relevant voltage at a certain ratio) to acquire the relevant voltage value as digital information.

The discharge control module 48 controls the discharge circuit 25 depending on the direct-current voltage acquired by the direct-current voltage acquiring module 47. For example, the discharge control module 48 controls of switching the operation state of the discharge switch 27 depending on a magnitude of the direct-current voltage acquired by the direct-current voltage acquiring module 47. Specifically, the discharge control module 48 puts the discharge switch 27 into the on-state if the direct-current voltage exceeds a predetermined value, and puts the discharge switch 27 into the off-state if the direct-current voltage is less than a predetermined value.

A monitoring module 49 performs an alarm processing depending on the operation state of the discharge switch 27. For example, the monitoring module 49 integrates a time period for which the discharge control module 48 puts the discharge switch 27 into the on-state and outputs an alarm signal if an integrated result exceeds a certain value. The alarm signal is used, besides to notify of an alarm state, to stop controlling the power converter circuit 10 and the like. The monitoring module 49 may clear the above integrated result in a case where the discharge switch 27 is kept in the off-state after becoming the on-state until a predetermined time period elapses. The above predetermined time period is a time period obtained by multiplying a time period for which the discharge switch 27 became the on-state most recently by a predetermined scaling factor, for example.

The carrier frequency setting module 51 sets the above carrier frequency in test on the basis of the operation state of the discharge switch 27. Specifically, the carrier frequency setting module 51 acquires information indicating the operation state of the discharge switch 27 from the discharge control module 48 to change the carrier frequency in test on the basis of the relevant information.

Figure 3A:
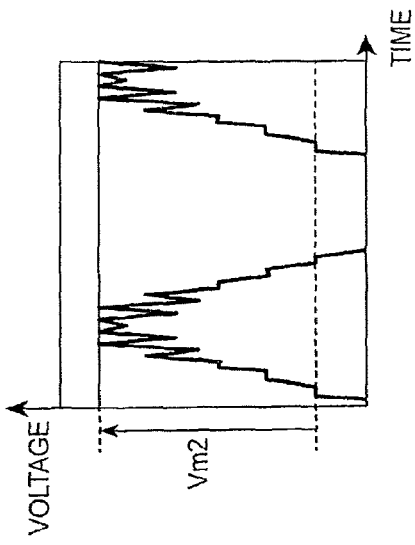
FIG. 3A and FIG. 3B are schematic views showing a difference in a waveform depending on presence or absence of resonance.
Figure 3B:
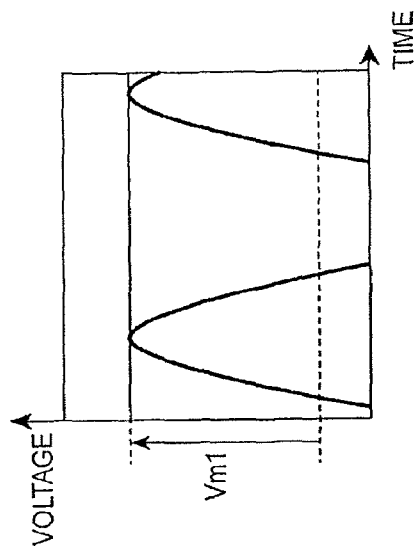

Here, a resonance phenomenon may occur on the high-frequency filter 15 side depending on the carrier frequency in test for generating the test voltage. FIG. 3A is a graph showing a voltage of the one-side line 4 in a case where the carrier frequency in test is sufficiently far from a resonant frequency of the high-frequency filter 15. FIG. 3B is a graph showing a voltage of the one-side line 4 in a case where the carrier frequency in test is closer to the resonant frequency of the high-frequency filter 15. In these graphs, an abscissa represents a time and an ordinate represents a voltage. For the sake of the description, these graphs each show the voltage of only one phase of the one-side line 4. As shown in these graphs, when the carrier frequency in test is closer to the resonant frequency of the high-frequency filter 15, a ripple component involved by switching at the carrier frequency in test is amplified by the resonance phenomenon with the high-frequency filter 15, and the voltage of the one-side line 4 is superimposed by a resonant voltage. This makes the voltage amplitude of the one-side line 4 larger from Vm1 to Vm2. If the voltage amplitude becomes larger, the direct-current voltage after rectified by the primary side diode bridge 22 also becomes larger to make the voltage between both ends of the capacitor 24 larger, which may be likely to increase a frequency at which the discharge switch 27 is in the on-state. For this reason, if the monitoring module 49 outputs the alarm signal, it is difficult to continue the constant determining processing for the alternating-current motor 3.

In contrast, by setting the carrier frequency in test so as to suppress the frequency at which the discharge switch 27 is in the on-state, it is possible to reliably perform the constant determining processing.

As the carrier frequency in test lowers, test voltage turbulence involved by switching the switch elements 12a and 12b is less likely to occur, which tends to enable the highly accurate test voltage (that is, a test voltage smaller in difference from a targeted value) to be generated. Therefore, the carrier frequency setting module 51 may change the carrier frequency in test in a range lower than the above carrier frequency in drive.

On the other, if the carrier frequency in test excessively lowers, test voltage delay with respect to the targeted value increases, which tends to cause the time for the constant determining processing to elongate. Therefore, the carrier frequency setting module 51 may change the carrier frequency in test in such a way as to search for a frequency at which the discharge switch 27 is not in the on-state and which is closer to the resonant frequency of the high-frequency filter 15. The carrier frequency in test closer to the resonant frequency of the high-frequency filter 15 is a frequency meeting the following conditions, for example.

Carrier frequency in test−Resonant frequency≤Carrier frequency in drive−Carrier frequency in test So long as the carrier frequency in test can be set to be closer to the resonant frequency of the high-frequency filter 15 in a range where the discharge switch 27 is not in the on-state, the carrier frequency setting module 51 may search for the carrier frequency in test by any procedure.

For example, the carrier frequency setting module 51 may change the carrier frequency in test in a range higher than the resonant frequency of the high-frequency filter, or may change the carrier frequency in test in a range lower than the relevant resonant frequency.

The carrier frequency setting module 51 may change the carrier frequency in test to be set farther from the resonant frequency of the high-frequency filter 15 until the discharge switch 27 enters the off-state. In this case, the carrier frequency setting module 51 may set the carrier frequency in test to a value at the time when the discharge switch 27 enters the off-state (hereinafter, referred to as a "boundary value"), or may set to a value slightly farther from the resonant frequency than the boundary value to leave a margin from the boundary value. A reference starting point for changing the carrier frequency in test may be a design value of the resonant frequency of the high-frequency filter 15, or an average value, maximum value, minimum value of actual measured data, or the like.

The carrier frequency setting module 51 may use the carrier frequency in drive as the reference starting point, for example, to change the carrier frequency in test to be closer to the resonant frequency of the high-frequency filter 15 until the discharge switch 27 enters the on-state. In this case, the carrier frequency setting module 51 may set the carrier frequency in test to a value slightly smaller than a value at the time when the discharge switch 27 enters the on-state.

The carrier frequency setting module 51 writes the set carrier frequency in test into the first frequency storage module 52. The above test control module 44 controls the power converter circuit 10 on the basis of the carrier frequency in test stored in the first frequency storage module 52.

Figure 4:
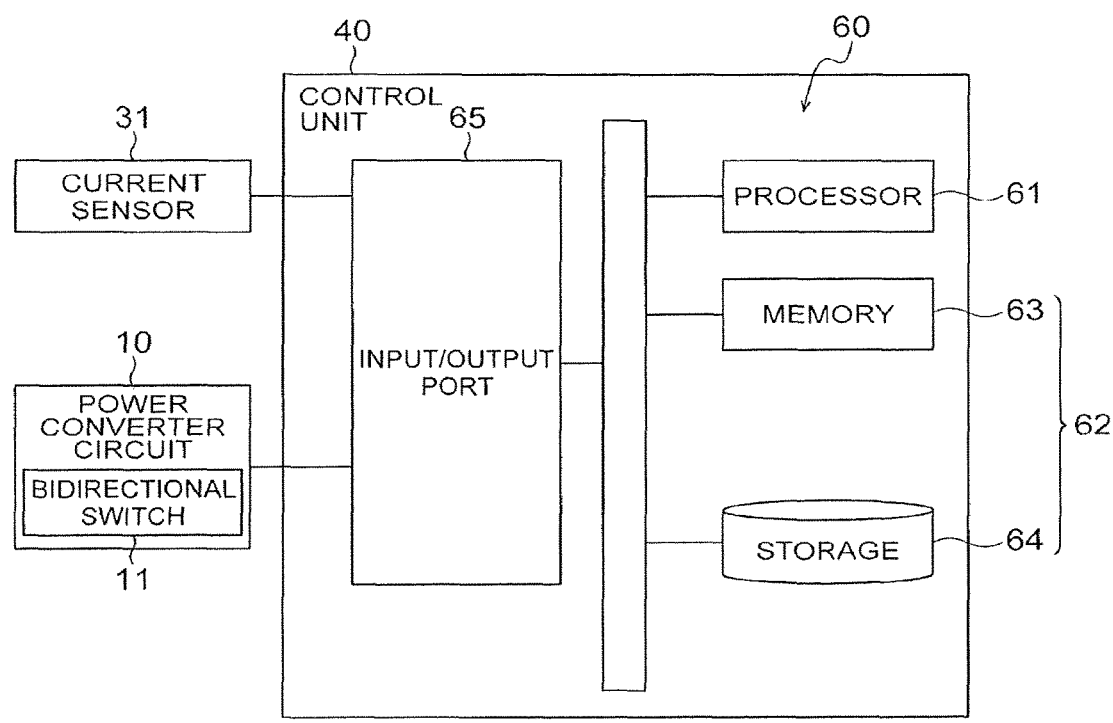
FIG. 4 is a diagram showing a hardware configuration of a control unit.

FIG. 4 is a diagram illustrating a hardware configuration of the control unit 40. As shown in FIG. 4, the control unit 40 has a control circuit 60, and the control circuit 60 has one or more processors 61, a storage module 62, and an input/output port 65.

The storage module 62 includes a memory 63 and a storage 64. The storage 64 has a program recorded therein for configuring the function modules of the control unit 40. The storage 64 may be any type so long as it is computer-readable. Specific examples of the storage 64 include a hard disk, a non-volatile semiconductor memory, a magnetic disk, and an optical disk. The memory 63 transitorily stores therein the programs loaded from storage 64, arithmetic results by the processor 61, and the like. The processor 61 executes the program in cooperation with the memory 63 to configure each function module of the control unit 40. The input/output port 65 inputs and outputs electrical signals to and from the current sensor 31, the bidirectional switch 11 and the like in response to commands from the processor 61.

The hardware configuration of the control unit 40 is not necessarily limited to those whose function modules are configured by means of the programs. For example, at least part of the above function modules of the control unit 40 may be a dedicated logic circuit or an ASIC (Application Specific Integrated Circuit) integrating the dedicated logic circuit.

[Procedure of Determining Constants of Alternating-Current Motor]

Hereinafter, as an example of a method for determining the constants of the alternating-current motor, a procedure of determining the constants of the alternating-current motor 3 performed by the control unit 40 is described. This procedure includes controlling the power converter circuit 10 on the basis of the carrier frequency in test such that the test voltage is applied to the alternating-current motor 3, changing the carrier frequency in test on the basis of the operation state of the discharge switch 27, and determining constants of the alternating-current motor 3 on the basis of the response state of the alternating-current motor 3 at the time when the test voltage is applied.

FIG. 5 is a flowchart showing a specific example of the constant determining procedure. As shown in FIG. 5, the control unit 40 first perform step S1. At step S1, the carrier frequency setting module 51 sets an initial value of a carrier frequency to write into the first frequency storage module 52. The initial value may be a design value of the resonant frequency of the high-frequency filter 15, or an average value, maximum value, minimum value of actual measured data, or the like.

Next, the control unit 40 performs step S2. At step S2, the test control module 44 controls the power converter circuit 10 to start applying the test voltage to the alternating-current motor 3. The test control module 44 controls the power converter circuit 10 on the basis of the carrier frequency in test stored in the first frequency storage module 52.

Next, the control unit 40 performs step S3. At step S3, the carrier frequency setting module 51 checks whether or not the discharge switch 27 is in the off-state.

In a case at step S3 where the discharge switch 27 is determined to not be in the off-state, the control unit 40 performs step S4. At step S4, the carrier frequency setting module 51 adds a predetermined pitch to the carrier frequency in test stored in the first frequency storage module 52. The relevant pitch is set by creating conditions in advance or other means so that the monitoring module 49 does not output the alarm signal in a course of setting the carrier frequency in test, for example.

After performing step S4, the control unit 40 returns the processing to step S3. After that, steps S3 and S4 are repeated until the discharge switch 27 enters the off-state. In other words, a processing of setting the carrier frequency in test farther from the above initial value by one pitch is repeated.

In a case at step S3 where the discharge switch 27 is determined to be in the off-state, the control unit 40 completes the repetition of steps S3 and S4. This sets the carrier frequency in test for the subsequent processings.

Next, the control unit 40 performs step S6. At step S6, the current acquiring module 43 acquires the directed value by the current sensor 31 as a value of the current of each phase to be output to the alternating-current motor 3.

Next, the control unit 40 performs step S7. At step S7, on the basis of the response state of the alternating-current motor 3 at the time when the above test voltage is applied, the constant determining module 45 determines the constants of the alternating-current motor 3. For example, the constant determining module 45 determines the constants of the alternating-current motor 3 on the basis of the current value acquired at step S6 by the current acquiring module 43.

Next, the control unit 40 performs step S8. At step S8, the test control module 44 controls the power converter circuit 10 to stop outputting the test voltage. The procedure of determining the constants of the alternating-current motor 3 completes here.

Effect According to Embodiment

As described above, the matrix converter 1 comprises a power converter circuit 10 performing bidirectional power conversion between one side and the other side thereof, the power converter circuit 10 being connectable on the one side thereof with the alternating-current supply via the high-frequency filter 15 and connectable on the other side thereof with the alternating-current motor 3, the snubber circuit 21 connected with the one-side line 4 for connecting the high-frequency filter 15 and the power converter circuit 10, the discharge switch 27 discharging a charge accumulated in the snubber circuit 21 depending on the voltage of the snubber circuit 21, the test control module 44 controlling the power converter circuit 10 on the basis of the carrier frequency in test such that the test voltage is applied to the alternating-current motor 3, the carrier frequency setting module 51 changing the carrier frequency in test on the basis of the operation state of the discharge switch 27, and the constant determining module 45 determining the constants of the alternating-current motor 3 on the basis of the response state of the alternating-current motor 3 at the time when the test voltage is applied.

According to the matrix converter 1, the constants of the alternating-current motor 3 are automatically tuned. Here, a resonance phenomenon may occur on the one-side line 4 side depending on the carrier frequency in test for generating the test voltage. If this resonance phenomenon causes the voltage amplitude on one side to become larger, the frequency at which the discharge switch 27 is in the on-state increases to make it difficult to continue the constant determining processing in some cases. In contrast to this, this matrix converter 1 includes the carrier frequency setting module 51 which changes the carrier frequency in test on the basis of the operation state of the snubber circuit 21. For this reason, by setting the carrier frequency in test so as to suppress the frequency at which the discharge switch 27 is in the on-state, it is possible to reliably perform the constant determining processing. Therefore, it is possible to provide the matrix converter 1 which is easy to set.

Since the carrier frequency setting module 51 uses the snubber circuit 21 to search for the carrier frequency in test, it is not necessary to add hardware specialized for searching for the carrier frequency in test. For this reason, the configuration of the matrix converter 1 can be implemented in many matrix converters including the existing matrix converter.

Since the frequency at which the discharge switch 27 is in the on-state is suppressed, improved service lives of the snubber circuit 21 and the discharge circuit 25 are expected. Further, since the resonance phenomenon on the one-side line 4 side is suppressed, improved service life of the capacitor 17 of the high-frequency filter 15 is expected.

The carrier frequency setting module 51 may change the carrier frequency in test in a range lower than the carrier frequency in drive. As described above, as the carrier frequency in test lowers, the test voltage turbulence involved by switching the switch elements 12a and 12b is less likely to occur, which tends to enable the highly accurate test voltage to be generated. Therefore, in order to improve the accuracy of the constant determination, it is preferable to lower the carrier frequency in test. Then, according to the configuration to change the carrier frequency in test in a range lower than the carrier frequency in drive, it is possible to satisfy both improvement in reliability of performing the constant determination and improvement in the accuracy of the constant determination.

The carrier frequency setting module 51 may change the carrier frequency in test in such a way as to search for a frequency at which the discharge switch 27 is not in the on-state and which is closer to the resonant frequency of the high-frequency filter 15. In order to satisfy both the accuracy and speed of the constant determination, it is preferable to set the carrier frequency in test to be closer to the resonant frequency of the high-frequency filter 15. For this reason, according to the configuration to search for the frequency at which the discharge switch 27 is not in the on-state and which is closer to the resonant frequency of the high-frequency filter 15, it is possible to satisfy both the improvement in the accuracy of the constant determination and the improvement in the speed of the constant determination (that is, reduction in a time required for the constant determination).

The carrier frequency setting module 51 may change the carrier frequency in test in a range higher than the resonant frequency of the high-frequency filter 15. In this case, it is possible to more reliably satisfy both the improvement in the accuracy and the improvement in the speed of the constant determination.

The carrier frequency setting module 51 may change the carrier frequency in test to set the carrier frequency in test farther from the resonant frequency of the high-frequency filter 15 until the discharge switch 27 enters the off-state. In this case, it is possible to quickly search for the frequency at which the discharge switch 27 is not in the on-state and which is closer to the resonant frequency of the high-frequency filter 15.

Hereinabove, the embodiment is described, but the present invention is not necessarily limited to the above embodiment, and may be variously modified within a scope not departing from the gist thereof.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A matrix converter comprising:
a power converter circuit performing bidirectional power conversion between one side and another side thereof, the power converter circuit being connectable on the one side thereof with an alternating-current supply via a high-frequency filter and connectable on the other side thereof with an alternating-current motor;

a snubber circuit connected with a one-side line for connecting the high-frequency filter and the power converter circuit;

a discharge switch discharging a charge accumulated in the snubber circuit depending on a voltage of the snubber circuit; and a control circuit configured to execute controlling the power converter circuit on the basis of a carrier frequency in test such that a test voltage is applied to the alternating-current motor, changing the carrier frequency in test on the basis of an operation state of the discharge switch, and determining a constant of the alternating-current motor on the basis of a response state of the alternating-current motor at a time when the test voltage is applied.

2. The matrix converter according to claim 1, wherein the control circuit is configured to change the carrier frequency in test in a range lower than a carrier frequency in drive.

3. The matrix converter according to claim 2, wherein the control circuit is configured to change the carrier frequency in test in such a way as to search for a frequency at which the discharge switch is not in an on-state, the frequency being closer to a resonant frequency of the high-frequency filter.

4. The matrix converter according to claim 3, wherein the control circuit is configured to change the carrier frequency in test in a range higher than the resonant frequency of the high-frequency filter.

5. The matrix converter according to claim 3, wherein the control circuit is configured to change the carrier frequency in test to set the carrier frequency in test farther from the resonant frequency of the high-frequency filter until the discharge switch enters an off-state.

6. The matrix converter according to claim 4, wherein the control circuit is configured to change the carrier frequency in test to set the carrier frequency in test farther from the resonant frequency of the high-frequency filter until the discharge switch enters an off-state.

7. A matrix converter comprising:

a power converter circuit performing bidirectional power conversion between one side and another side thereof, the power converter circuit being connectable on the one side thereof with an alternating-current supply via a high-frequency filter and connectable on the other side thereof with an alternating-current motor;

a snubber circuit connected with a one-side line for connecting the high-frequency filter and the power converter circuit;

a discharge switch discharging a charge accumulated in the snubber circuit depending on a voltage of the snubber circuit;

a test control means for controlling the power converter circuit on the basis of a carrier frequency in test such that a test voltage is applied to the alternating-current motor;

a carrier frequency setting means for changing the carrier frequency in test on the basis of an operation state of the discharge switch; and a constant determining means for determining a constant of the alternating-current motor on the basis of a response state of the alternating-current motor at a time when the test voltage is applied.

8. The matrix converter according to claim 7, wherein the carrier frequency setting means is configured to change the carrier frequency in test in a range lower than a carrier frequency in drive.

9. The matrix converter according to claim 8, wherein the carrier frequency setting means is configured to change the carrier frequency in test in such a way as to search for a frequency at which the discharge switch is not in an on-state, the frequency being closer to a resonant frequency of the high-frequency filter.

10. The matrix converter according to claim 9, wherein the carrier frequency setting means is configured to change the carrier frequency in test in a range higher than the resonant frequency of the high-frequency filter.

11. The matrix converter according to claim 9, wherein the carrier frequency setting means is configured to change the carrier frequency in test to set the carrier frequency in test farther from the resonant frequency of the high-frequency filter until the discharge switch enters an off-state.

12. The matrix converter according to claim 10, wherein the carrier frequency setting means is configured to change the carrier frequency in test to set the carrier frequency in test farther from the resonant frequency of the high-frequency filter until the discharge switch enters an off-state.

13. A method for determining constants of an alternating-current motor using a matrix converter, the matrix converter comprising a power converter circuit performing bidirectional power conversion between one side and another side thereof, the power converter circuit being connectable on the one side thereof with an alternating-current supply via a high-frequency filter and connectable on the other side thereof with an alternating-current motor; a snubber circuit connected with a one-side line for connecting the high-frequency filter and the power converter circuit; and a discharge switch discharging a charge accumulated in the snubber circuit depending on a voltage of the snubber circuit, the method comprising:

controlling the power converter circuit on the basis of a carrier frequency in test such that a test voltage is applied to the alternating-current motor;

changing the carrier frequency in test on the basis of an operation state of the discharge switch; and determining a constant of the alternating-current motor on the basis of a response state of the alternating-current motor at a time when the test voltage is applied.

* * * * *